(12) United States Patent
Williams et al.

(10) Patent No.: US 7,590,607 B2
(45) Date of Patent: Sep. 15, 2009

(54) NON-UNITARY PROBABILISTIC QUANTUM COMPUTING CIRCUIT AND METHOD

(75) Inventors: Colin P. Williams, Half Moon Bay, CA (US); Robert M. Gingrich, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1193 days.

(21) Appl. No.: 11/007,792

(22) Filed: Dec. 7, 2004

(65) Prior Publication Data
US 2005/0167658 A1     Aug. 4, 2005

Related U.S. Application Data

(60) Provisional application No. 60/528,362, filed on Dec. 9, 2003.

(51) Int. Cl.
*G06F 17/00* (2006.01)
*G06N 5/00* (2006.01)
(52) U.S. Cl. ............................. 706/45; 706/46; 706/47
(58) Field of Classification Search ...................... None
See application file for complete search history.

(56) References Cited

U.S. PATENT DOCUMENTS 5,768,297 A * 6/1998 Shor ........................... 714/763
6,128,764 A * 10/2000 Gottesman .................. 714/785
2004/0119061 A1 * 6/2004 Wu et al. ......................... 257/9
2005/0059167 A1 * 3/2005 Vitaliano et al. ............. 436/518

OTHER PUBLICATIONS

J. D. Franson, High-Fidelity Quantum Logic Operations Using Optical Elements, Sep. 23, 2002, The American Physical Society, 137901-1 to 137901-4.*
Cesar Miquel et al., Interpretation of tomography and spectrosopy as dual forms of quantum computation, Jul. 4, 2002, Nature.*
J.B. Altepeter et al., Single-qubit, entanglement-assisted and ancilla-assisted quantum process tomography, Nov. 21, 2002, 1-3.*
Barenco, A., et al., "Elementary Gates for Quantum Computation," *Physical Review A*, pp. 1-31 (1995).
DiVincenzo, D.P., et al., "Results on Two-Bit Gate Design for Quantum Computers," *Proc. Workshop on Physics and Computation*, Dallas, TX, IEEE Computer Society Press, pp. 14-23, (1994).
Fenner, S.A., et al., "Universal Quantum Computation with Two- and Three-Qubit Projective Measurements," Internet: <http://arxiv.org/abs/quant-ph/0111077> pp. 1-12 (2001).

(Continued)

*Primary Examiner*—Joseph P Hirl
(74) *Attorney, Agent, or Firm*—Steinfl & Bruno

(57) ABSTRACT

A quantum circuit performing quantum computation in a quantum computer. A chosen transformation of an initial n-qubit state is probabilistically obtained. The circuit comprises a unitary quantum operator obtained from a non-unitary quantum operator, operating on an n-qubit state and an ancilla state. When operation on the ancilla state provides a success condition, computation is stopped. When operation on the ancilla state provides a failure condition, computation is performed again on the ancilla state and the n-qubit state obtained in the previous computation, until a success condition is obtained.

16 Claims, 1 Drawing Sheet

OTHER PUBLICATIONS

Franson, J.D., et al., "High-Fidelity Quantum Logic Operations Using Linear Optical Elements," *Phys. Rev. Lett.*, vol. 89, No. 13, pp. 137901-1-137904 (2002).

Knill, E., et al., "A Scheme For Efficient Quantum Computation with Linear Optics," *Nature*, vol. 409, pp. 46-52 (Jan. 4, 2001).

Nielsen, M.A., et al., *Quantum Computation and Quantum Information*, Cambridge University Press, Cambridge, United Kingdom, (2000).

Nielsen, M.A., "Universal Quantum Computation Using Only Projective Measurement, Quantum Memory, and Preparation of the $|0\rangle$ State," Internet: <http://arxiv.org/abs/quant-ph/0108020> pp. 1-4 (2001).

Raussendorf, R., et al., "A One-Way Quantum Computer," *Physical Review Letters*, vol. 86, No. 22, pp. 1-2 (May 28, 2001).

Song, L., et al., "Computational Synthesis of Any N-Qubit Pure or Mixed State," *Proceedings of the SPIE*, vol. 5105, pp. 195-203 (2003).

Vatan, F., et al., "Optimal Quantum Circuits for General Two-Qubit Gates," Internet: <http://arxiv.org/abs/quant-ph/0308006> pp. 1-6 (2004).

\* cited by examiner

NON-UNITARY PROBABILISTIC QUANTUM COMPUTING CIRCUIT AND METHOD

CROSS REFERENCE TO RELATED APPLICATIONS

This application claims the benefit of U.S. provisional Patent Application Ser. No. 60/528,362, filed Dec. 9, 2003 for a "Non-Unitary (Probabilistic) Quantum Circuit Design" by Colin P. Williams and Robert M. Gingrich, the disclosure of which is incorporated herein by reference in its entirety.

STATEMENT REGARDING FEDERALLY SPONSORED RESEARCH OR DEVELOPMENT

This invention described herein was made in the performance of work under a NASA contract, and is subject to the provisions of Public Law 96-517 (35 USC 202) in which the Contractor has elected to retain title.

BACKGROUND

1. Technical Field

The present disclosure relates to the field of quantum computing. In particular, it relates to a non-unitary probabilistic quantum computing circuit and method.

Throughout the description of the present disclosure, reference will be made to the enclosed Annex A1, which makes part of the present disclosure.

2. Description of the Prior Art

Physical realization of quantum computers is based on quantum circuits which perform operations based on quantum computation.

The traditional model of quantum computation is described in M. Nielsen and I. Chuang, "Quantum Computation and Quantum Information," Cambridge University Press (2000), (Nielsen-Chuang), also shown as reference [1] in the 'References' Section of Annex A1. The 'References' section of Annex A1 also contains a list of additional references [2] through [11].

Quantum computation is built upon the concept of quantum bit (qubit), as explained in Section 1.2 of Nielsen-Chuang, which is incorporated herein by reference. A qubit has a plurality of possible states, the most important of which are the $|0\rangle$ state and the $|1\rangle$ state, where the Dirac notation is used to indicate those states.

States of a quantum systems can be represented by state vectors made of qubits or density operators $\rho$. Density operators are explained in Section 2.4. of Nielsen-Chuang, also incorporated herein by reference.

Evolution of a quantum system can be expressed in terms of a transformation $$\rho_{in} \rightarrow \frac{U\rho_{in}U^+}{tr(U\rho_{in}U^+)}$$

where U is a unitary operator which depends only on a time t1 before the transformation and a time t2 after the transformation. Disadvantages of evolutions of quantum systems based on unitary operators are described in section I of Annex A1.

Alternative models of quantum computing using non-unitary operators are also possible, as referenced by citations [2, 3, 4, 5, 6] in Section I of Annex A1.

SUMMARY

According to a first aspect, a quantum circuit adapted to perform quantum computation in a quantum computer to probabilistically achieve a chosen transformation of an initial n-qubit state is provided, comprising: a unitary quantum operator operating on a qubit state and an ancilla state to obtain an evolved qubit state and an evolved ancilla state; and a measurement operator to measure the evolved ancilla state, the evolved ancilla state being adapted to assume a success condition or a failure condition, wherein when the evolved ancilla state assumes a success condition the chosen transformation is obtained, and when the evolved ancilla state assumes a failure condition the unitary quantum operator further operates on the ancilla state and the evolved qubit state, the unitary quantum operator further operating on the ancilla state and previously evolved qubit states until the evolved ancilla state assumes a success condition.

According to a second aspect, a method for probabilistic performance of quantum computation in a quantum circuit adapted to be used in a quantum computer is provided, comprising: providing an arbitrary non-unitary transformation N; obtaining a unitary quantum operator from the non-unitary transformation N; providing an ancilla qubit; providing a qubit state; evolving the ancilla qubit under the unitary quantum operator; evolving the qubit state under the unitary quantum operator; measuring the evolved ancilla state; stopping computation if the evolved ancilla state assumes a success condition; further evolving the ancilla qubit and the evolved qubit state under the unitary quantum operator if the evolved ancilla state assumes a failure condition; further evolving the ancilla qubit and a previously evolved qubit state under the unitary quantum operator until the evolved ancilla state assumes a success condition.

The present disclosure contributes to the field of quantum computer design. Specifically, it allows discovery/design of quantum circuits that implement computations naturally described by non-unitary matrix transformations. This includes the solution of NP-Complete and NP-Hard problems such as scheduling, planning, diagnosis, routing and search, which solutions can be applied, for example, to computers or networks. The techniques according to the present disclosure can also be used to induce quantum circuits that synthesize arbitrary quantum states.

DETAILED DESCRIPTION

Figure 1:
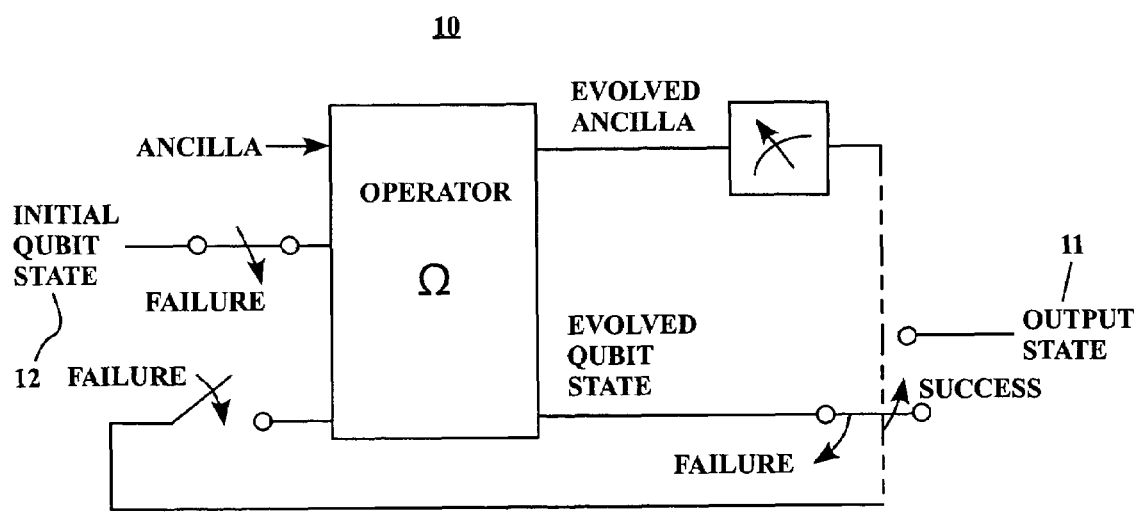
FIG. 1 shows a schematic representation of a circuit operating in accordance with the method of the present disclosure.

The present disclosure is directed to a method for designing circuits and a circuit performing non-unitary computations probabilistically. In particular, a method is shown to build a circuit performing the non-unitary transformation shown in Equation (1) of Section I of Annex A1, together with a circuit operating according to such method.

In accordance with a first step of the method according to the present disclosure, an arbitrary non-unitary transformation N is introduced, as shown in section I of Annex A1.

A second, optional, step is that of "padding" matrix N to make it a square $2^n \times 2^n$ dimensional matrix, as shown in equation (2) of Section II of Annex A1.

In a third step, a unitary quantum operator $\Omega$ is defined, starting from N, as shown in equation (3) of Section II. The operator $\Omega$ will operate on the n-qubit state.

In a fourth step, an ancilla or work qubit, prepared in the state $|1\rangle\langle1|$ is provided, so that an ancilla augmented state $$|1\rangle\langle1| \otimes \rho_{in}$$

is formed.

In a fifth step, the ancilla-augmented state is evolved under $\Omega$, as shown in equation (4) of Section II. As a consequence, the operator $\Omega$ operates both on the ancilla and the n-qubit state. Therefore, both the ancilla state and the n-qubit state evolve under operation of the operator $\Omega$, to reach an evolved ancilla state and an evolved qubit state.

In a sixth step, the evolved ancilla state is measured in the $\{|0\rangle, |1\rangle\}$ basis, by definition of measurement operators $M_0$ and $M_1$, as shown in equation (5) of Section II. Quantum measurement as such is disclosed, for example, in Section 2.2.3 of Nielsen-Chuang, also incorporated herein by reference.

Upon measurement, the evolved ancilla state can be either the $|0\rangle$ state (success) or the $|1\rangle$ state (failure). The success probability $p_0$ and the failure probability $p_1$ are shown in equations (6) of Section II. The corresponding density matrices $\rho_0$ and $\rho_1$ are shown in equations (7) of Section II.

If the measurement results in failure (ancilla in the $|1\rangle$ state), the ancilla is reintroduced and the evolution performed by equation (4) of Annex A1 is performed again, using the reduced density matrix $\rho_1$ of equation (7) of Annex A1. In other words, the operator $\Omega$ will operate, in this second operation, on an augmented state formed by the original ancilla and the evolved qubit state obtained through the first operation of the operator $\Omega$. If, by virtue of the second operation, the ancilla is measured to be still in the $|1\rangle$ state, a third operation will take place, where the operator $\Omega$ will operate on an augmented state formed by the original ancilla and the evolved qubit state obtained through the second operation of the operator $\Omega$. This process is repeated until the ancilla is found in the success condition, i.e. the $|0\rangle$ state.

Once measurement of the ancilla yields to the success condition, the remaining unmeasured qubits will be in a state that approximates the desidered non-unitary transformation.

Section III of Annex A1 and equations (10), (11), (12) and (13) of Section III show that, upon failure, the effective operation applied to the n-qubit state is close to the identity. As a consequence, failed attempts at projecting the desired non-unitary computation are not devastating. Indeed, they can be made arbitrarily small at the cost of reducing the success probability.

Section IV of Annex A1 shows examples of the fidelity and success probability achievable for four random non-unitary transformations of a random 2-qubit mixed state. As shown in equation (3) of Section II, the unitary operator $\Omega$ also depends on a constant $\epsilon$. The constant $\epsilon$ affects both the fidelity with which the desired non-unitary transformation is achieved, as well as its probability of occurrence. In particular, as $\epsilon \to 0$, the fidelity $\to 1$, and the success probability $\to 0$.

Section V of Annex A1 shows a circuit operating according to the method described above.

FIG. 1 of the present application is similar to FIG. 2 of Section V of Annex A1. FIG. 1 shows a quantum circuit 10 synthesizing an arbitrary n-qubit pure state 11 from evolution of a state 12. Element 13 shows measurement of the ancilla state after transformation. In case of failure (evolved ancilla is in the $|1\rangle$ state), the evolved qubit state is input back to the operator until success (evolved ancilla is in the $|0\rangle$ state) is obtained. As soon as this occurs, the evolved qubit state forms the output state.

While several illustrative embodiments of the invention have been shown and described in the above description and in the enclosed Annex A1, numerous variations and alternative embodiments will occur to those skilled in the art. Such variations and alternative embodiments are contemplated, and can be made without departing from the scope of the invention as defined in the appended claims.

ANNEX A1

Non-Unitary Probabilistic Quantum Computing

We present a method for designing quantum circuits that perform non-unitary quantum computations on $n$-qubit states probabilistically, and give analytic expressions for the success probability and fidelity. Our scheme works by embedding the desired non-unitary operator within an anti-block-diagonal $(n+1)$-qubit Hamiltonian, $H$, which induces a unitary operator $\Omega = \exp(i\varepsilon H)$, with $\varepsilon$ a constant. By using $\Omega$ acting on the original state augmented with an ancilla prepared in the $|1\rangle$ state, we can obtain the desired non-unitary transformation whenever the ancilla is found to be $|0\rangle$. Our scheme has the advantage that a "failure" result, i.e., finding the ancilla to be $|1\rangle$ rather than $|0\rangle$, perturbs the remaining $n$-qubit state very little. As a result we can repeatedly re-evolve and measure the sequence of "failed" states until we find the ancilla in the $|0\rangle$ state, i.e., detect the "success" condition. We describe an application of our scheme to probabilistic state synthesis.

I. INTRODUCTION

In the traditional model of quantum computation one prepares an $n$-qubit state, evolves it under the action of a unitary operator representing the desired computation, and makes a projective measurement on the output state to obtain an answer [1]. In this view, measurement operations are a necessary evil required to extract an answer from the computer, typically at the cost of destroying valuable information encoded in the final superposition state. However, alternative models of quantum computing are possible, which embrace non-unitary operations and elevate them to the status of legitimate gates in the toolbox of the quantum circuit designer [2, 3, 4, 5, 6]. The importance of such non-standard models is that they may inspire new approaches to achieving universal quantum computing hardware that might be easier to implement than the traditional scheme, e.g., by trading quantum circuit complexity for success probability.

Although there has been considerable prior work on designing circuits for performing unitary quantum computations deterministically [7, 8, 9, 10], far less attention has been paid to developing methods for designing circuits that perform *non-unitary* computations *probabilistically*. This is the focus of our paper. Specifically, we present a scheme that allows us to construct a quantum circuit for performing the non-unitary transformation $$\rho_{in} \to \frac{N \rho_{in} N^\dagger}{\text{tr}(N \rho_{in} N^\dagger)} \qquad (1)$$

where $N$ is an arbitrary non-unitary transformation, and $\rho_{in}$ is an arbitrary $n$-qubit density operator. Note that such a non-unitary transformation is well-defined if and only if $\det(N) \neq 0$. If this condition is not met, we must explicitly exclude input states, $\rho_{in}$, such that $N \rho_{in} N^\dagger$ is the zero matrix. Without loss of generality, we may assume the non-unitary matrix $N$ is of dimension $2^n \times 2^n$. If, initially, $N$ has fewer than $2^n$ rows or columns, we must pad $N$ with zeroes to the right of the columns, and/or beneath the rows, sufficient to make a $2^n \times 2^n$ dimensional matrix. The trace in the denominator guarantees that the output will be properly normalized.

The paper is organized as follows. Section II describes our procedure for embedding an arbitrary non-unitary operator within a larger unitary one, and how to use the result to achieve the desired non-unitary state transformation probabilistically. Section III provides an analysis of the success probability and fidelity of the achieved transformation. Section IV gives some examples of random non-unitary transforms of random input states to illustrate the tradeoff between fidelity and success probability. Section V illustrates how our non-unitary quantum computing procedure can be applied to probabilistic state synthesis.

II. NON-UNITARY EMBEDDING PROCEDURE

Given an arbitrary non-unitary matrix, $N$, our goal is to devise a quantum circuit sufficient to achieve the transformation $\rho_{in} \rightarrow N\rho_{in}N^\dagger / \text{tr}(N\rho_{in}N^\dagger)$. To do so we use $N$ to build a "designer" Hamiltonian that acts on the $n$ original qubits plus one extra ancilla qubit. By reading the output state of the ancilla, we can test whether or not the desired non-unitary transformation has been applied to the $n$-qubit state.

The first step in our non-unitary embedding procedure is to pad $N$, if necessary, to make it a square $2^n \times 2^n$ dimensional matrix:

$$N \xrightarrow{pad} \underbrace{\begin{pmatrix} N & 0 \\ \hline 0 & 0 \end{pmatrix}}_{2^n} \tag{2}$$

Next, we define the unitary operator, $\Omega$, via a Hamiltonian built from $N$. Specifically, let:

$$\Omega = \exp\left(i\varepsilon \begin{pmatrix} 0 & -iN \\ iN^\dagger & 0 \end{pmatrix}\right) \tag{3}$$

where $\varepsilon$ is a constant. This constant, $\varepsilon$, affects both the fidelity with which we are able to achieve the desired non-unitary transformation as well as its probability of occurrence.

Next, we introduce an ancilla qubit prepared in the state $|1\rangle\langle 1|$, and evolve the ancilla-augmented state under $\Omega$:

$$\rho_{out} = \Omega\left(|1\rangle\langle 1| \otimes \rho_{in}\right)\Omega^\dagger \tag{4}$$

Finally, we measure the ancilla in the $\{|0\rangle, |1\rangle\}$ basis. Specifically, we define a pair of measurement operators $M_0$ and $M_1$ as:

$$M_0 = (|0\rangle\langle 0|) \otimes I$$
$$M_1 = (|1\rangle\langle 1|) \otimes I \tag{5}$$

where $I$ is the $2^n \times 2^n$ dimensional identity matrix. We find the ancilla in the $|0\rangle$ ("success") or $|0\rangle$ ("failure") state with respective probabilities $p_0$ and $p_1$ given by:

$$p_0 = \text{tr}(M_0^\dagger M_0 \rho_{out})$$
$$p_1 = \text{tr}(M_1^\dagger M_1 \rho_{out}) \tag{6}$$

The corresponding density matrices, conditioned on these measurement outcomes, are:

$$\rho_0 = \frac{M_0 \rho_{out} M_0^\dagger}{p_0}$$

$$\rho_1 = \frac{M_1 \rho_{out} M_1^\dagger}{p_1}$$

(7)

If the measurement results in "failure" i.e., finding the ancilla to be in the $|1\rangle$ state, we re-introduce the ancilla, and perform the evolution described by equation. 4, but this time using the reduced density matrix $\rho_1$ rather than $\rho_{in}$. This process can be repeated indefinitely, using the sequence of reduced density operators generated by successive failures, until the ancilla is found in the "success" condition, i.e., $|0\rangle$. This is possible because, as we will show in §III, upon "failure" the effective operation applied to the $n$-qubit state is close to the identity. Hence, "failed" attempts at projecting the desired non-unitary computation are not devastating. Indeed, they can be made arbitrarily delicate at the cost of reducing the success probability.

Once measurement of the ancilla yields the "success" condition, the remaining $n$ unmeasured qubits will be in a state that approximates the desired non-unitary transformation. For example, if we happen to succeed on the first measurement, we will have succeeded in transforming our initial state into:

$$\rho_{out}^{actual} = tr_1(\rho_0) \tag{8}$$

This is to be compared against the state transformation we were hoping to obtain, namely:

$$\rho_{out}^{desired} = \frac{N \rho_{in} N^\dagger}{tr(N \rho_{in} N^\dagger)} \tag{9}$$

III. SUCCESS PROBABILITY AND FIDELITY

It is natural to ask with what efficiency and fidelity can the desired non-unitary transformation be obtained? To answer these questions, it is helpful to construct the singular value decomposition (SVD) of the desired non-unitary operation.

$$N = U^\dagger \Sigma V \tag{10}$$

Using the SVD, we can write the unitary operator $\Omega = \exp(i\varepsilon H)$ as $$\Omega = \exp\left(i\varepsilon \begin{pmatrix} 0 & -iN \\ iN^\dagger & 0 \end{pmatrix}\right)$$

$$= \begin{pmatrix} U^\dagger \cos(\varepsilon\Sigma)U & 0 \\ 0 & V^\dagger \cos(\varepsilon\Sigma)V \end{pmatrix} + \begin{pmatrix} 0 & U^\dagger \sin(\varepsilon\Sigma)V \\ -V^\dagger \sin(\varepsilon\Sigma)U & 0 \end{pmatrix} \tag{11}$$

In this form we can see immediately what operations are performed when the ancilla measurement "succeeds" or "fails", i.e., yields $|0\rangle$, or $|1\rangle$ respectively. As $\Omega$ acts upon a state of the form $\begin{pmatrix} 0 & 0 \\ 0 & 1 \end{pmatrix} \otimes \rho_{in}$, upon "failure" the effective transformation is $N_{fail} = V^\dagger \cos(\varepsilon\Sigma)V$ and upon "success" the effective transformation is $N_{succ} = U^\dagger \sin(\varepsilon\Sigma)V$. Hence, if the projective measurement fails $k$ times before it first succeeds, the net transformation applied to the input state will be $N_{net} = N_{succ} N_{fail}^k$. Note that this transformation is independent of the state acted upon, $\rho_{in}$, but does depend upon the scaling parameter in the Hamiltonian, $\varepsilon$. The smaller $\varepsilon$, the closer to performing the identity operation (a "no-op") on each failed attempt. Hence, to ensure high fidelity we need $\varepsilon$ to be small. Mathematically, after $k$ failures and one success, the actual state created is:

$$\rho_{out}^{actual} = \frac{N_{net} \rho_{in} N_{net}^\dagger}{tr(N_{net} \rho_{in} N_{net}^\dagger)} \qquad (12)$$

Thus to estimate the fidelity (conditioned on success at the $(k + 1)$-th trial) we need to compute:

$$F(\rho_{out}^{actual}, \rho_{out}^{desired}) = tr\sqrt{\sqrt{\rho_{out}^{actual}} \rho_{out}^{desired} \sqrt{\rho_{out}^{actual}}} \qquad (13)$$

IV. SOME EXAMPLES

In this section, we give some examples of the fidelity and success probability achievable for four random non-unitary transformations of a random 2-qubit mixed state. The particular details of the non-unitary transformations and state we used are not important. We merely wish to illustrate that for random non-unitary transformations of random states as $\varepsilon \to 0$ the fidelity $\to 1$, the success probability $\to 0$, and the expected fidelity (the product of the two) can have quite complicated behavior. The point is that there is a tradeoff between the probability of achieving the desired non-unitary transformation and its fidelity: the smaller $\varepsilon$, the better we can approximate the desired non-unitary transformation, but the more attempts we will need to make to achieve it.

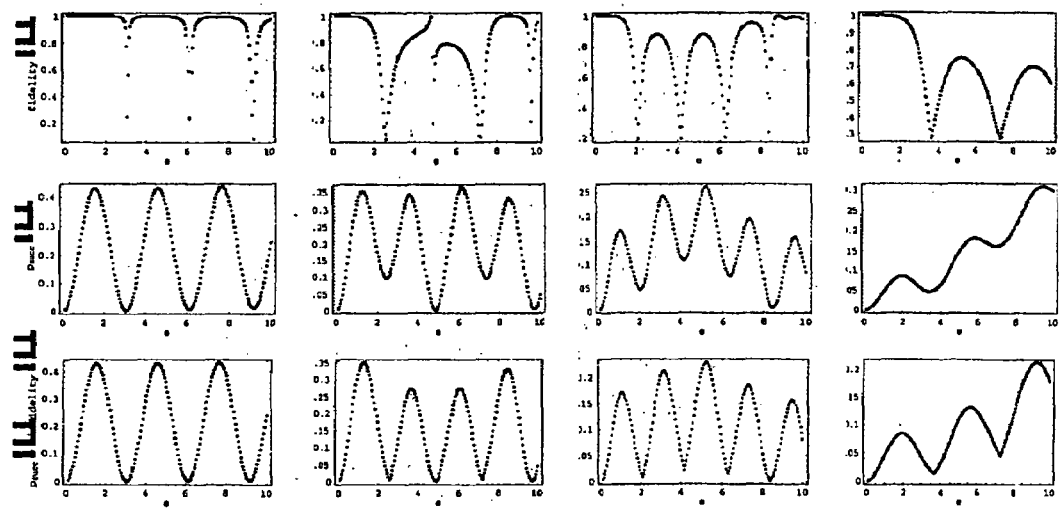

Fig. 1. Four examples (read in columns) of random non-unitary transformations of random input states. The plots are, from top to bottom, the fidelity of the transformation, the success probability, and the product of fidelity times success probability. The results illustrate that there is a tradeoff between the fidelity with which we can approximate the desired non-unitary transformation, and the efficiency with which we can do it.

V. APPLICATION: NON-UNITARY STATE SYNTHESIS

Although schemes for deterministic state synthesis are known, e.g., [11], we will now describe a scheme for *probabilistic* state synthesis using non-unitary quantum computing. Our goal is to find a quantum circuit sufficient to synthesize an arbitrary $n$-qubit pure state $|\psi\rangle = \sum_{i=0}^{2^n-1} c_i |i\rangle$. To do so, we find a unitary transformation sufficient for synthesizing the desired state probabilistically, and then decompose this unitary transformation into an equivalent quantum circuit. The latter decomposition can be done using, e.g., the generalized singular value decomposition [9], implemented in the QCD quantum circuit design software package [9].

Our non-unitary (probabilistic) state synthesis scheme is depicted in Fig. 2.

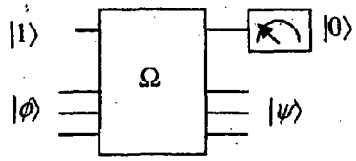

Fig. 2. An equally weighted superposition, $|\phi\rangle = (W \otimes W ... \otimes W)|00...0\rangle$ is evolved together with an ancilla under the action of $\Omega$, which is induced from a Hamiltonian containing the non-unitary operator, $N$. Subsequently, if the ancilla is found to be $|0\rangle$ the remaining qubits will be prepared in the desired superposition state.

We begin by considering the non-unitary transformation defined by:

$$N = \sqrt{2^n} \begin{pmatrix} c_0 & 0 & 0 & 0 \\ 0 & c_1 & 0 & 0 \\ 0 & 0 & \ddots & 0 \\ 0 & 0 & 0 & c_{2^n-1} \end{pmatrix} \qquad (14)$$

Conceptually, if the operation $N$ were available to use, then we could use the equally weighted superposition state, $|\phi\rangle = W^{\otimes n}|00...0\rangle$ (where $W$ is the Walsh-Hadamard gate), to create the desired superposition state $|\psi\rangle$ from the non-unitary operation $N \cdot W^{\otimes n}|00...0\rangle = |\psi\rangle$. However, as $N$ is a non-unitary operation it is not immediately available. Instead, we have to embed $N$ within a larger unitary operation whose outcome is conditioned on the value of an ancilla qubit. Specifically, we define the Hamiltonian $H = \varepsilon \begin{pmatrix} 0 & -iN \\ iN^\dagger & 0 \end{pmatrix}$ and hence, implicitly, the unitary operator $\Omega = \exp(i\varepsilon H)$. Next we introduce an ancilla prepared in the $|1\rangle$ state, perform the evolution $\Omega|1\rangle|\phi\rangle$, and then measure the ancilla. If we find the ancilla to be $|0\rangle$ we are done, as the remaining $n$-qubits will be in state $|\psi\rangle$. Otherwise, if we find the ancilla to be $|1\rangle$, we evolve the output again under $\Omega$ and measure the ancilla. We continue until we find the ancilla to be $|0\rangle$, whereupon the desired state will have been synthesized.

Empirically, we find that the minimum depth of the circuit for *probabilistically* synthesizing $|\psi\rangle$ is typically less than the minimum depth of the circuit for *deterministically* synthesizing $|\psi\rangle$ [9,11], but at the expense of possibly having to repeat the synthesis attempt several times. Nevertheless, this could point to an interesting tradeoff in the design space of quantum computing hardware. If it proves to be experimentally challenging to maintain quantum coherence for several gate operations, but relatively easy to introduce extra qubits, then non-unitary quantum computation might allow certain quantum computations to be achieved non-deterministically that would otherwise be beyond the reach of experimental capability.

VI. CONCLUSIONS

We have presented a systematic technique for achieving non-unitary quantum computations probabilistically by embedding the desired non-unitary operation within a larger unitary one. The latter unitary operator can be decomposed into an equivalent quantum circuit using algebraic, numerical or genetic techniques [7, 8, 9, 10]. Hence, our scheme provides a method for designing a quantum circuit sufficient to implement an arbitrary non-unitary operation probabilistically. Empirically, we find that the resulting circuits can have smaller depth than those used to synthesize the same state deterministically. More work needs to be done on characterizing these bounds.

Acknowledgement: The research described in this paper was performed at the Jet Propulsion Laboratory (JPL), California Institute of Technology, under contract with the National Aeronautics and Space Administration (NASA). We would like to thank the National Security Agency (NSA) and the Advanced Research and Development Activity (ARDA) for funding support.

REFERENCES

[1] M. Nielsen and I. Chuang, "*Quantum Computation and Quantum Information*," Cambridge University Press, ISBN 0-521-63503-9 (2000).
[2] M. A. Nielsen, "Universal Quantum Computation Using Only Projective measurement, Quantum Memory, and Preparation of the $|0\rangle$ State", quant-ph/0108020 (2001).
[3] S. A. Fenner, and Y. Zhang, "Universal Quantum Computation with Two-Qubit and Three-Qubit Projective Measurements", quant-ph/0111077, (2001).
[4] R. Raussendorf and H. J. Briegel, "A One-Way Quantum Computer", Physical Review Letters, Volume 86, Number 22, 28 May (2001), pp.5188-5191.
[5] E. Knill, R. Laflamme, and G. J. Milburn, "A Scheme for Efficient Quantum Computation with Linear Optics," Nature 409, 46 (2001).
[6] J. D. Franson, M. M. Donegan, M. J. Fitch, B. C. Jacobs, and T. B. Pittman, "High-fidelity quantum logic operations using linear optical elements," Phys. Rev. Lett. 89, 137901 (2002).
[7] A. Barenco, Physical Review A, 52, 3457, (1995).
[8] D. P. Di Vincenzo and J. Smolin, "Results on Two-Qubit Gate Design for Quantum Computers," in Proc. Workshop on Physics and Computation, Dallas, TX, IEEE Computer Society Press, (1994) pp.14-23.
[9] L. Song and C. P. Williams, "Quantum Circuit Decomposition of an Arbitrary Unitary Operator," submitted to Physical Review Letters, (2003).
[10] F. Vatan and C. P. Williams, "Optimal Quantum Circuits for General Two-Qubit Gates," submitted to Physical Review Letters. See preprint quant-ph/0308006 (2003).
[11] L. Song, and C. P. Williams, "Computational Synthesis of Any N-Qubit Pure or Mixed State," Quantum Information and Computation, E. Donkor, A. R. Pirich, H. E. Brandt (eds.), in Proc. SPIE Vol. 5105 (2003) pp.195-203.

What is claimed is:

1. A quantum circuit adapted to perform quantum computation in a quantum computer to probabilistically achieve a chosen transformation of an initial n-qubit state, comprising:
   a unitary quantum operator operating on a qubit state and an ancilla state to obtain an evolved qubit state and an evolved ancilla state; and
   a measurement operator to measure the evolved ancilla state, the evolved ancilla state being adapted to assume a success condition or a failure condition,
   wherein when the evolved ancilla state assumes a success condition the chosen transformation is obtained, and when the evolved ancilla state assumes a failure condition the unitary quantum operator further operates on the ancilla state and the evolved qubit state, the unitary quantum operator further operating on the ancilla state and previously evolved qubit states until the evolved ancilla state assumes a success condition.

2. The quantum circuit of claim 1, wherein the unitary quantum operator is formed from a non-unitary quantum operator.

3. The quantum circuit of claim 2, wherein the unitary quantum operator is induced from a Hamiltonian containing the non-unitary quantum operator.

4. The quantum circuit of claim 1, wherein the ancilla state is a $|1\rangle\langle1|$ state.

5. The quantum circuit of claim 4, wherein the success condition corresponds to the $|0\rangle$ evolved ancilla state.

6. The quantum circuit of claim 4, wherein the failure condition corresponds to the $|1\rangle$ evolved ancilla state.

7. The quantum circuit of claim 1, wherein the unitary quantum operator depends on a non-unitary matrix N and a constant $\epsilon$.

8. The quantum circuit of claim 7, wherein the unitary quantum operator is defined through a Hamiltonian built from N.

9. The quantum circuit of claim 7, wherein the unitary quantum operator has an expression $$\Omega = \exp\left(i\varepsilon\begin{pmatrix} 0 & -iN \\ iN^+ & 0 \end{pmatrix}\right).$$

10. The quantum circuit of claim 2, wherein the quantum computation is a transformation $$\rho_{in} \rightarrow N\rho_{in}N^\dagger/tr(N\rho_{in}N^\dagger),$$

wherein N is the non-unitary quantum operator and wherein $\rho_{in}$ is the qubit state.

11. The quantum circuit of claim 10, wherein the qubit state is an n-dimensional qubit state and N is a $2^n \times 2^n$ dimensional matrix.

12. A quantum computer comprising the quantum circuit according to claim 1.

13. A method for probabilistic performance of quantum computation in a quantum circuit adapted to be used in a quantum computer, comprising:
   providing an arbitrary non-unitary transformation N;
   obtaining a unitary quantum operator from the non-unitary transformation N;
   providing an ancilla qubit;
   providing a qubit state;
   evolving the ancilla qubit under the unitary quantum operator;
   evolving the qubit state under the unitary quantum operator;
   measuring the evolved ancilla state;
   stopping computation if the evolved ancilla state assumes a success condition;
   further evolving the ancilla qubit and the evolved qubit state under the unitary quantum operator if the evolved ancilla state assumes a failure condition;
   further evolving the ancilla qubit and a previously evolved qubit state under the unitary quantum operator until the evolved ancilla state assumes a success condition.

14. The method of claim 13 wherein N is amended to form a $2^n \times 2^n$ matrix.

15. A quantum circuit operating according to the method of claim 14.

16. A quantum computer operating according to the method of claim 14.

* * * * *

UNITED STATES PATENT AND TRADEMARK OFFICE
CERTIFICATE OF CORRECTION

PATENT NO. : 7,590,607 B2  Page 1 of 1
APPLICATION NO. : 11/007792
DATED : September 15, 2009
INVENTOR(S) : Williams et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1316 days.

Signed and Sealed this

Twenty-first Day of September, 2010

David J. Kappos
*Director of the United States Patent and Trademark Office*